US008129465B2

(12) United States Patent
Seliskar et al.

(10) Patent No.: US 8,129,465 B2
(45) Date of Patent: Mar. 6, 2012

(54) POLYMERIC MATERIAL AND PROCESS FOR FORMING AND USING SAME

(75) Inventors: James Thomas Seliskar, Bay City, MI (US); James David Oelberg, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/950,548

(22) Filed: Nov. 19, 2010

(65) Prior Publication Data
US 2011/0065855 A1 Mar. 17, 2011

Related U.S. Application Data

(63) Continuation of application No. 11/622,197, filed on Jan. 11, 2007.

(60) Provisional application No. 60/822,531, filed on Aug. 16, 2006.

(51) Int. Cl.
*C08K 5/00* (2006.01)
*C08K 5/01* (2006.01)
*C08J 5/18* (2006.01)
*B29C 45/00* (2006.01)
*B29C 45/17* (2006.01)

(52) U.S. Cl. ........ 524/515; 524/502; 524/451; 524/500; 524/528; 525/240; 525/50; 525/191

(58) Field of Classification Search .................. 524/502, 524/451, 500, 515, 528; 525/240, 50, 191
See application file for complete search history.

(56) References Cited

U.S. PATENT DOCUMENTS

| | | | |
|---|---|---|---|
| 3,236,917 A | 2/1966 | Natta et al. | |
| 3,645,992 A | 2/1972 | Elston | |
| 4,701,432 A | 10/1987 | Welborn, Jr. | |
| 4,935,397 A | 6/1990 | Chang | |
| 4,937,299 A | 6/1990 | Ewen et al. | |
| 4,937,301 A | 6/1990 | Chang | |
| 5,055,438 A | 10/1991 | Canich | |
| 5,194,509 A | 3/1993 | Hasenbein et al. | |
| 5,272,236 A | 12/1993 | Lai et al. | |
| 5,278,272 A | 1/1994 | Lai et al. | |
| 6,177,515 B1 | 1/2001 | Smith et al. | |
| 6,251,997 B1 | 6/2001 | Imai et al. | |
| 6,300,419 B1 * | 10/2001 | Sehanobish et al. | 525/191 |
| 6,329,454 B1 | 12/2001 | Krabbenborg | |
| 6,403,692 B1 * | 6/2002 | Traugott et al. | 524/451 |
| 6,417,240 B1 * | 7/2002 | Park | 521/59 |
| 6,689,841 B2 | 2/2004 | Jung et al. | |
| 6,734,253 B2 | 5/2004 | Krabbenborg et al. | |
| 6,869,993 B2 | 3/2005 | Watanabe et al. | |
| 6,967,225 B2 | 11/2005 | Mcenhill et al. | |
| 2002/0082328 A1 * | 6/2002 | Yu et al. | 524/423 |
| 2003/0229169 A1 | 12/2003 | Han | |
| 2004/0044107 A1 | 3/2004 | Kikuchi | |
| 2005/0154101 A1 * | 7/2005 | Mcenhill et al. | 524/210 |
| 2006/0058434 A1 | 3/2006 | Watanabe | |
| 2007/0117909 A1 | 5/2007 | Seliskar et al. | |
| 2007/0246862 A1 | 10/2007 | Jones et al. | |
| 2008/0045645 A1 | 2/2008 | Seliskar et al. | |
| 2008/0169055 A1 | 7/2008 | Seliskar et al. | |

FOREIGN PATENT DOCUMENTS

| | | |
|---|---|---|
| EP | 129368 | 12/1984 |
| EP | 260999 A1 | 9/1987 |
| EP | 639613 A1 | 2/1995 |
| WO | 90/07526 | 7/1990 |
| WO | 00/77335 A1 | 12/2000 |
| WO | 01/42344 A1 | 6/2001 |
| WO | 02/22731 A | 3/2002 |
| WO | 02/085972 A | 10/2002 |
| WO | 2004/009657 A1 | 1/2004 |
| WO | 2005/111145 A | 11/2005 |
| WO | 2007/002435 A1 | 1/2007 |
| WO | 2008/020925 A1 | 7/2008 |
| WO | 2008/085649 A1 | 7/2008 |

OTHER PUBLICATIONS

International Search Report PCT/US2007/067363, Aug. 22, 2007.
Hifax X 1956A, Advanced Plyolefin, Product Information Sheet.
Copending application, Application No. PCT/US09/37078, filed Mar. 13, 2009.
International Preliminary Report on Patentability, Dated Jul. 25, 2008, International Application No. PCT/US2007/067363.
Copending, U.S. Appl. No. 12/981,217, filed Oct. 22, 2008.
Copending, U.S. Appl. No. 12/256,301, filed Oct. 22, 2008.
Copending, U.S. Appl. No. 61/148,549, filed Jan. 30, 2009.

* cited by examiner

*Primary Examiner* — James J Seidleck
*Assistant Examiner* — Deve E Valdez
(74) *Attorney, Agent, or Firm* — Dobrusin & Thennisch PC

(57) ABSTRACT

The present invention is directed to a polymeric material, particularly a thermoplastic material, the includes thermoplastic polyolefin and an elastomer.

19 Claims, 1 Drawing Sheet

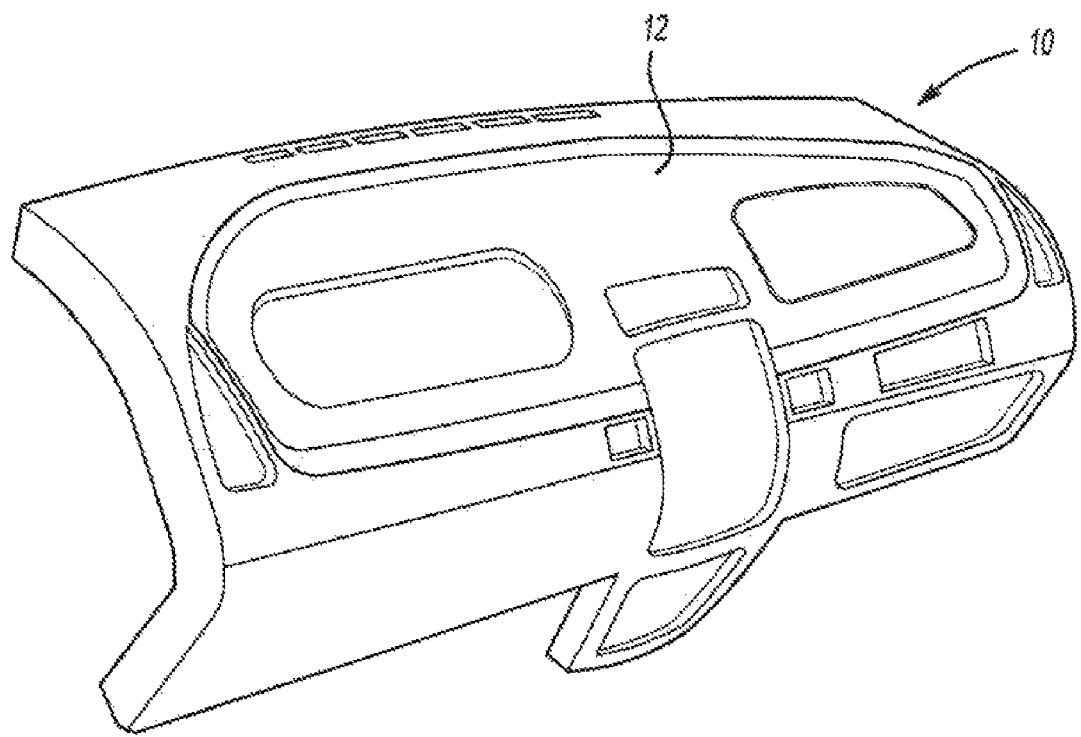

POLYMERIC MATERIAL AND PROCESS FOR FORMING AND USING SAME

CLAIM OF BENEFIT OF FILING DATE

The present application is a continuation of co-pending. U.S. patent application Ser. No. 11/622,197, filed on Jan. 11, 2007 which is a nonprovisional application of U.S. Provisional Patent Application No. 60/822,531 filed Aug. 15, 2006. The present application claims the benefit of the filing date of U.S. patent application Ser. No. 11/622,197, filed on Jan. 11, 2007 and of U.S. Provisional Patent Application No. 60/822,531, filed Aug. 15, 2006, the entire contents of which are both incorporated herein by reference.

FIELD OF THE INVENTION

The present invention relates to a polymeric material (e.g., a thermoplastic material) and a process for forming and/or using the same. More particularly, the present invention relates to a thermoplastic material that is a blend of one or more thermoplastic polyolefins and one or more elastomers and to a process of forming and/or using the same.

BACKGROUND OF THE INVENTION

In the field of polymers there continues to be a need for materials that have good mechanical properties, and which are relatively inexpensive and efficient to make. Due to raw material costs, processing costs, energy costs and the like, it has become increasing desirable to find and produce polymeric materials (e.g., thermoplastics) that exhibit desirable characteristics (e.g., good physical strength, desirable aesthetic appearance or the like) while maintaining or achieving relatively lower costs. In the field of thermoplastic polyolefins, for example, it would be desirable to provide a polymeric material that exhibited desirable characteristics such as strength, scratch and/or mar resistance, durability, ductility and/or other additional or alternative characteristics without the need to employ costly ingredients or processes. For example, it may be desirable to avoid the use of relatively high cost or relatively highly processed (e.g., grafted) polymers, specialty fillers or agents, or other additional or alternative relatively costly ingredients, processes or the like while still maintaining desirable characteristics.

Examples from the literature addressing the preparation of materials in this field include: U.S. Pat. Nos. 6,300,419; 6,869,993; 6,967,225; 6,734,253; 6,177,515; 6,251,997; 6,329,454; 6,689,841; 6,403,692 and U.S. Patent Publication 2006/0058434 all of which are hereby expressly incorporated by reference.

SUMMARY OF THE INVENTION

Accordingly, the present invention discloses a polymeric material and a process of forming the polymeric material into a part. The polymeric material is a polymeric composition that is comprised of thermoplastic polyolefin and polyolefin elastomer. The thermoplastic polyolefin includes polypropylene and the thermoplastic polyolefin includes a highly crystalline portion that is at least 50% by weight of the thermoplastic polyolefin. The polyolefin elastomer is typically about 10% to about 25% by weight of the polymeric composition. The thermoplastic polyolefin can be about 60% to about 90% by weight of the polymeric composition. The highly crystalline portion of the thermoplastic polyolefin can be formed substantially entirely of one or more polypropylenes and can have crystallinity greater than about 50%. The polyolefin elastomer can be substantially entirely formed of one or more SLEPs, LEPs or both. The polymeric composition can be substantially without any grafted polymers, calcined fillers or both. Also, the polymeric composition can include at least about 75% by weight polypropylene.

In one embodiment, the weight percent (W) of the polyolefin elastomer within the polymeric composition varies with the MFR (M) of the highly crystalline portion of thermoplastic polyolefin according the following equation:

$$W=0.43(M)+15.8$$

wherein the polyolefin elastomer is typically in a range that is determined by (W) according to the above equation and about ±30% thereof. The polymeric composition can be shaped into a part, for example by injection molding, and the part can have a surface formed of the polymeric composition wherein surface exhibits a scratch resistance of at least about 7 newtons and possible between about 10 and 12 newtons.

DESCRIPTION OF THE DRAWINGS

FIG. 1 is an illustration of an exemplary article in accordance with an aspect of the present invention.

DETAILED DESCRIPTION OF THE INVENTION

The present invention is directed to an improved polymeric material, processes of forming and/or using the material and components or parts formed of the polymeric material and/or by the processes. The polymeric material is typically comprised of thermoplastic polyolefin, elastomer and one or more additives that can include, without limitation, filler, antioxidant, molding agent, amine, amide, combinations thereof or others. The thermoplastic polyolefin can be comprised of one or more thermoplastics, but typically includes polypropylene (PP), polyethylene (PE) or both with at least a portion of the polypropylene and/or polyethylene have a relatively high crystallinity. The elastomer can include a variety of elastomers, but preferably includes one or more linear ethylene copolymers or interpolymers (also known as "LEPs") and/or one or more substantially linear ethylene copolymers or interpolymers (also known as "SLEPs"). As used herein, SLEPs typically include LEPs. Advantageously, the polymeric material can be employed to form parts or components with desirable characteristics at relatively low cost.

The polymeric material can include a variety of polymers such as thermoplastic polymers, thermosettable polymers, elastomers or any combination thereof. Suitable plastic materials can include, without limitation, thermosettable plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomer (e.g., Surlyn), polyvinyl chloride ("PVC") and including blends of two or more of these thermoplastics and/or thermosets such as PC and ABS. Of course, the polymeric material can include other polymers or additives within the scope of the present invention.

According to preferred embodiments, the polymeric material includes a substantial portion of thermoplastic polyolefin, and more particularly, includes a substantial portion of polypropylene, polyethylene or both. The polymeric material or composition typically includes at least about 40% although possibly less, more typically at least about 60% and still more typically at least about 75% by weight polypropylene, polyethylene or a combination thereof. The polymeric material also typically includes less than about 95% although possibly more, more typically less than about 90% and possibly less than about 85% by weight polypropylene, polyethylene (e.g., HDPE or LDPE) or a combination thereof.

A substantial portion of the thermoplastic polyolefin of the polymeric composition is typically relatively highly crystalline. Thus, a relatively high percentage of the polypropylene, the polyethylene or a combination thereof is isotactic and/or has crystallinity greater than certain predetermined values. The thermoplastic polyolefin will typically be comprised of ingredients (e.g., polypropylene, polyethylene or both) wherein at least 50% but possibly less, more typically at least 70% and even more typically at least 85% by weight of the thermoplastic polyolefin has a crystallinity greater than about 40%, more typically greater than about 50% and even more typically greater than about 60%, still more typically greater than about 65% and even possibly greater than about 75%.

Percent crystallinity is measured by differential scanning calorimetry, according to ASTM D3417. A milligram size sample of polymer is sealed into an aluminum DSC pan. The sample is placed into a DSC cell with a 25 cubic centimeter per minute nitrogen purge and cooled to −100 C. A standard thermal history is established for the sample by heating at 10 C/minute to 225° C. The sample is then cooled (at 10° C./minute) to −100° C. and reheated at 10° C./minute to 225° C. The observed heat of fusion for the second scan is recorded ($\Delta H_{observed}$). The observed heat of fusion is related to the degree of crystallinity in weight percent based on the weight of the polypropylene sample by the following equation:

$$\% \text{ Crystallinity} = \frac{\Delta H_{observed}}{\Delta H_{isotacticPP}} \times 100,$$

where the heat of fusion for isotactic polypropylene as reported in B. Wunderlich, Macromolecular Physics, Volume 3, Crystal Melting, Academic Press, New York, 1980, p. 48, is 165 Joules per gram of polymer.

Typically there is a preference for the relatively high crystallinity portion of the thermoplastic polyolefin to be comprised of at least 60%, more typically at least 75%, even more typically at least 95% or even substantially entirely or entirely of one or more polypropylenes (e.g., one type of polypropylene or a blend of 2, 3, 4, or more polypropylenes). However, a percentage of the relatively high crystalline portion or another portion of the thermoplastic polyolefin can be polyethylene (e.g., HDPE). When included, the polyethylene typically comprises between about 1% and about 15% of the thermoplastic polyolefin.

The relatively high crystallinity portion of the polyolefin, whether it is entirely of one or more polypropylenes or it includes polyethylene or otherwise, typically has a melt flow rate (MFR) within a desired range. That MFR is typically less than about 29 g/10 min, more typically less than about 22 g/10 min and even more typically less than about 20 g/10 min, but is typically greater than about 0.1 g/10 min, more typically greater than about 0.5 g/10 min and possibly greater than about 4 g/10 min, although higher or lower values may be possible unless otherwise stated.

In one embodiment, it is preferred for the thermoplastic polyolefin to include a first polypropylene having a first or lower MFR and a second polypropylene having a second or higher MFR. The first polypropylene has a melt flow rate (MFR) melt flow rate of less than about 50 g/10 min (at 230° C., 2.16 kg) (e.g., about 1 to about 50 g/10 min, more particularly about 3 to about 20 g/10 min, and still more particularly about 6 g/10 min to about 13 g/10 min). The first polypropylene can be a neat polypropylene or a blended polypropylene but is typically a polypropylene homopolymer, although not required unless otherwise stated. The first polypropylene, when included, is typically at least about 1%, more typically at least about 10% and even more typically at least about 25%, but typically less than about 95%, more typically less than about 85% and even more typically less than about 70% by weight of the polymeric material.

When included, the second polypropylene typically has a melt flow rate (MFR) of less than about 70 g/10 min (at 230° C., 2.16 kg) (e.g., about 1 to about 55 g/10 min, more particularly about 5 to about 45 g/10 min, and still more particularly about 25 g/10 min to about 40 g/10 min). The second polypropylene can be a neat polypropylene or a blended polypropylene but is typically a polypropylene homopolymer, although not required unless otherwise stated. The second polypropylene, when included, is typically at least about 0.1%, more typically at least about 5% and even more typically at least about 8%, but typically less than about 60%, more typically less than about 40% and even more typically less than about 22% by weight of the polymeric material.

It is also contemplated that the thermoplastic polyolefin can comprise one or more lower crystallinity grades of polypropylene, polyethylene or both (i.e., grades of polypropylene having crystallinity below the crystallinity of the first and second polypropylenes), which may be isotactic, syndiotactic or atactic. When included, such lower crystallinity materials will typically comprise at least about 0.5%, more typically at least about 2.0% and even more typically at least about 6%, but typically less than about 25%, although possibly more, more typically less than about 16% and even more typically less than about 10% by weight of the overall polymeric material.

Several polypropylenes suitable as the high crystallinity polypropylenes, the first or second polypropylenes, combinations thereof or the lower crystallinity polypropylenes are listed herein and discussed below as PP-1, PP-2 and PP-3. Of course, others may be used as described herein or otherwise.

The elastomer of the polymeric material can comprise a variety of elastomers but typically includes a substantial portion of thermoplastic elastomer and the thermoplastic elastomer typically includes one or more polyolefin and/or alpha-olefin elastomers (e.g., SLEPs, LEPs or both). The thermoplastic elastomer may be a neat elastomer or a blend. Substantially linear and linear ethylene polymers (SLEPs) are particularly preferred. Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; and EP 129,368; EP 260,999; and WO 90/07526, which are fully incorporated herein by reference.

As used herein, "a linear or substantially linear ethylene polymer" means a homopolymer of ethylene or a copolymer of ethylene and one or more alpha-olefin comonomers having a linear backbone (i.e. no cross linking), a specific and limited amount of long-chain branching or no long-chain branching, a narrow molecular weight distribution, a narrow composition distribution (e.g., for alpha-olefin copolymers) or a combination thereof. More explanation of such polymers is discussed in U.S. Pat. No. 6,403,692, which is incorporated herein by reference for all purposes.

In preferred embodiments, the one or more polyolefin elastomers will each include an alpha-olefin comonomer. Illustrative alpha-olefins include propylene, 1-butene, 1-hexene, 4-methyl-1-pentene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene and styrene. The alpha-olefin is desirably a $C_3$-$C_{20}$ or $C_3$-$C_{10}$ alpha-olefin. Preferred copolymers include EP, EB, ethylene/hexene-1 (EH) and EO polymers. Illustrative terpolymers include an ethylene/propylene/octene terpolymer as well as terpolymers of ethylene, a $C_3$-$C_{20}$ alpha-olefin and a diene such as dicyclopentadiene, 1,4-hexadiene, piperylene or 5-ethylidene-2-norbornene. The polyolefin elastomers can have densities less than about 0.9 g/cc, melt flow rates of about 0.1 to about 30 g/10 min (at 190° C., 2.16 kg), and more specifically about 0.5 to about 25 g/10 min (at 190° C., 2.16 kg) and can have glass transition temperatures of less than about −30 C, or any combination thereof. The materials used herein optionally are substantially free of EPDM rubber.

In the polymeric material, the elastomer will typically be present in an amount less than about 60 wt %, more particularly less than about 50 wt %, and more specifically less than about 25 wt % but is typically greater than about 1 wt %, more typically greater than about 7 wt % and still more typically greater than about 10 wt % of the polymeric material. Higher or lower amounts of elastomer may also be employed unless otherwise specified. The make-up of the elastomer is typically such that the elastomer is comprised of a substantial amount or entirely of polyolefin elastomer. Typically at least 50%, although possibly less, more typically at least about 70% and even more typically at least about 90% by weight of the elastomer is comprised of one or more of the above discussed polyolefin elastomers (e.g., a SLEP, LEP or combination of both). It is also contemplated that the elastomer may be entirely, substantially entirely or consist essentially of one or more of the SLEPs, LEPs or a combination thereof as discussed herein. Examples of a suitable material that includes or consists essentially of an elastomer are commercially available from The Dow Chemical Company under the designation of ENGAGE® (e.g., including EG-8100, EG-8150 and/or EG-8200).

To achieve desired results, in certain embodiments, it can be desirable for the amount of thermoplastic or polyolefin elastomer (e.g. the SLEPs, LEPs or both) be within a range where that range is dependent upon the melt flow rate of the relatively highly crystalline portion of the thermoplastic polyolefin of the polymeric material. It has been found that that it is generally desirable for the weight percent (W) of the polyolefin elastomer (W) within the polymeric material to vary with the MFR (M) of the highly crystalline portion of thermoplastic polyolefin according the following equation:

$$W=0.43(M)+15.8$$

Thus, for a given MFR of the highly crystalline portion, the weight percent of the thermoplastic elastomer, and more particularly, the polyolefin elastomer is typically in a range that is determined by (W) according to the above equation and about ±30%, more typically ±20% and even more typically ±10% and even possibly ±5% thereof. For example, for an MFR (M) of 8, the weight percent (W) of polyolefin elastomer is 19.24% by weight ±10% thereof or about 17.316% to about 21.164% by weight of the polymeric material. This relationship has been found to be particular useful when amounts and types of fillers are used in accordance with the teachings here, although the relationship can be otherwise useful as well.

Advantageously, it has been found that desired properties (e.g., scratch and mar resistance and other discussed herein or otherwise) can be achieved through a proper balance of thermoplastic polyolefin and polyolefin elastomer, particularly if those ingredients are chosen appropriately without the need for grafted polymers. Thus, it is contemplated that the polymeric material of the present invention will be substantially without any grafted polymers or may consist essentially of non-grafted polymers. It is also contemplated, however, that such ingredients can be included in the polymeric material unless otherwise indicated.

As such, it is contemplated that the thermoplastic polyolefin and particularly the one or more polypropylenes can be neat polymers, homopolymers or both. However, it is additionally contemplated that such terms and such material can allow for some degree of impurity which is typically less that 5%, more typically less than 2% and even more typically less that 0.8% by weight of whichever ingredient is specified.

Unless otherwise stated, "melt flow rate" and "melt index" herein is determined by ISO 1133. For polypropylene, polyethylene or combinations thereof, tests are at 230° C. with a 2.16 kg weight. For elastomer, tests are at 190° C. and 2.16 kg.

The polymeric material can also include filler. The filler can be at least about 4%, although possibly less, more typically at least about 9%, even more typically at least about 14% and still more typically at least about 17% by weight of the polymeric material and is also typically less than about 50%, although possibly more, more typically less than about 35%, even more typically less than about 25% and still more typically less than about 22% by weight of the polymeric material.

The filler can comprise multiple different filler materials or one singular filler material. Examples of suitable filler materials include, without limitation, clay, aramid, calcium carbonate, talc, kaolin, mica, wollastonite, hollow glass beads, titaninum oxide, silica, carbon black, glass fiber, potassium titanate, silicate material, combinations thereof or the like which can take the form of powders, platelets or otherwise. One preferred filler material is talc and, in preferred embodiments, the filler is comprised of at least about 50%, more typically at least about 85% and even more typically at least about 95% talc. It is also contemplated that the filler be comprised entirely of talc without any other filler materials being within the polymeric material. One preferred talc is a powdered talc sold under the tradename JETFIL 7C, which is commercially available from Luzenac Inc., 423 Wyecroft Rd., Oakville, ON.

While it is contemplated that the filler could include calcined filler materials, in a preferred embodiment of the polymeric material, the filler is substantially without any calcined filler materials or consists of or consists essentially of uncalcined filler materials. Thus, it is contemplated that the polymeric material, the filler or both include less than about 5% by weight and more preferably less than about 1% by weight and still more preferably less than about 0.1% by weight and possibly entirely without any calcined filler material.

It is also contemplated that the polymeric material can include a variety of other additives such as surfactants, flexibilizers, strength agents, ignition resistant additives, stabilizers, colorants, antioxidants, antistats, slip-aids (i.e., slip resistance aid), flow enhancers, nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used. One preferred additive is antioxidant, which, when included, is typically included in a relatively small weight percentage of the overall polymeric material (e.g., less than about 1 or 2 percent). One preferred antioxidant is IRGANOX B225 antioxidant commercially available from Ciba Specialy Chemicals Corporation. Irganox B225 antioxidant is a blend of 1 part Irganox 1010 antioxidant and 1 part Irgafos 168 tris(2,4-t-butylphenyl) phosphite. Another preferred additive is a molding agent (e.g., a wax, mold relief or slip-aid). One preferred molding agent is a nitrogen or ammonia group containing compound such as an amine or an amide. One preferred nitrogen containing compound, which is a wax, is an erucamide sold under the tradename KENAMIDE ULTRA E, commercially available from Chemtura Corporation, Middlebury, Conn.

The various components of the polymeric material can be admixed and/or compounded according to a variety of protocols. Preparation of the filled polymeric material of this invention can be accomplished by any suitable mixing means known in the art, including dry blending the individual components and subsequently melt mixing, either directly in an extruder used to make the finished article (e.g., the automotive part), or pre-mixing in a separate extruder (e.g., a Banbury mixer). Dry blends of the compositions can also be directly injection molded without pre-melt mixing.

When softened or melted by the application of heat, the filled thermoplastic compositions of this invention can be fabricated into articles using conventional techniques such as compression molding, injection molding, gas assisted injection molding, calendering, vacuum forming, thermoforming, extrusion and/or blow molding, alone or in combination. The filled thermoplastic compositions can also be formed, spun, or drawn into films, fibers, multi-layer laminates or extruded sheets, or can be compounded with one or more organic or inorganic substances, on any machine suitable for such purpose. The filled thermoplastic compositions of the present invention are preferably injection molded.

In one preferred embodiment, it is contemplated that the ingredients of the polymeric material are combined in such a manner that substantially all or all of the ingredients other than the relatively highly crystalline portion of the thermoplastic polyolefin are compounded together to form an admixture followed by compounding the admixture with the highly crystalline portion. For example, an admixture could be formed of the lower crystallinity polypropylene, the elastomer (e.g., the LEPs, SLEPs or both), the filler (e.g., the talc), the molding agent (e.g., the erucamide wax), the antioxidant or any combination thereof. Then, the admixture may be combined (e.g., melt mixed or blended) with the highly crystalline portion at a later time such as at the molding of the article (e.g., during or just prior to injection molding of the polymeric material).

The polymeric material of the present invention can be employed as part of a variety of articles of manufacture, however, it has already been found particularly suitable for use in forming automotive parts such as a panel, fascia (e.g., bumper fascia), automotive trim, automotive cowling, console (e.g., center overhead and/or floor assemblies) bumper beam, pillar, instrument panel, glove box assemblies including doors, knee bolster assemblies or instrument panel retainer assemblies or structural components. The polymeric material may also be used to form articles such as a snow mobile cowling or body cover, a personal water craft cowling or body cover, an all terrain vehicle cowling, fender, panel or body cover, an electrical equipment device housing, an appliance housing, a freezer container; lawn and garden furniture, building and construction sheets, a shoe, a boot, an outer ski boot shell, or an outer skate shell or the like.

In one preferred embodiment, the polymeric material is molded to form an instrument panel and/or dashboard 10 of an automotive vehicle as illustrated in FIG. 1 with a surface 12 visible from the interior of a fully manufactured vehicle. It will be understood that one or more pigments or colorants may be added to the polymeric material such that the parts or components are "molded-in-color". Advantageously, an instrument panel or dashboard as illustrated in FIG. 1 can have multiple desired properties such as scratch and mar resistance when formed of the polymeric material of the present invention.

It will be understood that, whatever part or article is formed from the polymeric material of the present invention, ingredients may be added to tailor the material to a particular use (e.g., it may be desirable to add a UV stabilizer to the material when used to form an exterior component of a vehicle).

The following examples illustrate various aspects of the present invention. The values shown are approximate and should not be regarded as limiting of the inventions. Variations in the processing parameters are possible as disclosed throughout the specification. In addition, the results shown may vary as well (e.g., by +/−10% or +/−25% of the stated values or even higher).

Materials resulting from the teachings herein will have any combination of at least one, two (and more specifically at least 3 or all) of the following properties; namely, a flexural modulus that ranges from about 1300 to about 3000 MPa, more specifically about 1700 to about 2500 MPa, and still more specifically about 1900 to about 2300 MPa; failure in a ductile mode (e.g., multi-axial dart impact testing (Instrumented Dart Impact)) of greater than about 90% of samples, and more specifically, approximately 100% (at −40° C., −30° C. or 0° C.); scratch resistance according to FLTM BN108-13 of at least about 7 newtons, more typically at least about 10, 12 or 14 newtons (e.g., at least about 15 Newtons); and heat distortion under load (HDT) according to ISO 75 of greater than about 180° F. and more typically greater than about 203 or 211° F.

EXAMPLES

Examples of formulations for polymeric materials (the ingredients of which are more fully described in the paragraphs following the tables) in accordance with the present invention are provided in Tables I and II as well as properties measured for one of the polymeric materials below:

TABLE I

|  | Wt. Percents |
|---|---|
| PELLETS | |
| PP-2 | 59.5 |
| S/LEP-1 | 17 |
| PP-1 | 6 |
| POWDER | |
| TALC-1 | 17 |
| Erucamide | 0.3 |
| Antioxidant | 0.2 |

TABLE I-continued

| PROPERTIES | Values |
| --- | --- |
| IDI 32F number ductile failures | 10/10 |
| IDI 32F total energy in-lbs | 417 |
| Peak energy in-lbs | 257 |
| ISO DTUL 66 psi flat (F.) | 219 |
| Lt. Cashmere Fawn2 grain 5 finger scratch (Newtons) | 12 |
| MFR g/10 min | 6.9 |
| FlexModulus Mpa | 2203 |
| FlexStrength Mpa | 37 |

TABLE II

| Ingredients | Wt. Percents |
| --- | --- |
| PP-2 | 25-85% |
| PP-3 | 1-40% |
| PP-1 | 1-10% |
| S/LEP-1 | 10-25% |
| TALC-1 | 5-20% |
| Antioxidant | 0.01-0.5% |
| Slip Aid (e.g., Erucamide) | 0.01-0.5% |

It should be understood that various ingredients may be substituted, added or removed from the above formulations without departing from the scope of the present invention. Moreover, it is contemplated that the weight percentages of the above ingredients and the values of the properties listed may vary up to or greater than ±5%, ±10%, ±25% or ±50% of the values listed. For example, a value of 10±10% results in a range of 9 to 11.

"PP-1" is a high impact polypropylene copolymer having an ethylene content of about 12%, a density of 0.89 g/cm$^3$, a melt flow rate of 1.2 at 230° C. and an applied load of 2.16 kg;

"PP-2" is an isotatic polypropylene homopolymer available as D118.01 Dow propylene from The Dow Chemical Company having a density of 0.90 g/cm$^3$ and a melt flow rate of 8 at 230° C. and an applied load of 2.16 kg;

"PP-3" is an isotatic polypropylene homopolymer available as D221 from The Dow Chemical Company having a density of 0.90 g/cm$^3$, a melt flow rate of 35 at 230° C. and an applied load of 2.16 kg;

"S/LEP-1" is a substantially linear ethylene/octene copolymer available as ENGAGE® EG 8200 from The Dow Chemical Company having a density of approximately 0.87 g/cm$^3$, a melt flow rate of 5 g/10 min. determined at 190° C. and an applied load of 2.16 kg, a molecular weight distribution of 2.1 and a CBDI of greater than 50;

"TALC 1" is a commercially available uncalcined mineral talc available as JETFIL™ 7C from Luzenac having a median particle size of 1.5 microns and a maximum particle size of 10 to 12 microns;

"Erucamide" is a slip or scratch resistance agent formed of an unsaturated fatty amide with the formula $C_{22}H_{43}NO$ and also referred to as cis-13-docosenoic amide, (Z)-13-docosenamide, erucylamide, (Z)-docos-13-enamide and available as KEMAMIDE™ from Witco; and "IRGANOX™ B 225 FF" is a 1:1 mixture of IRGANOX 1010 and tris(2,4-di-tert-butylphenyl phosphite antioxidant available from Ciba Geigy in the form of a flake.

Testing, unless otherwise stated, is preferably performed according to the following specifications:

"MFR" melt flow rate is determined according to ISO 1133 on a Kayness apparatus operating at 230° C. and an applied load of 2.16 kg;

"Flexural Tangent Modulus" is determined in accordance with ISO 178. Testing is performed using a United mechanical tester;

"Density" is measured according to ISO 1183;

"HDT" heat distortion under load is determined on a Ceast HDT 300 Vicat machine in accordance to ISO 75 where test specimens are unannealed and tested under an applied pressure of 0.45 MPa;

"Dart" instrumented impact is determined according to ASTM D 3763 using a MTS 810 instrumented impact tester at 15 miles per hour (MPH) impact. Test results were determined at 0° C. Specimens were inspected and judged as brittle or ductile fractures, test results are reported as number of specimens with ductile behavior; and "Scratch Resistance" levels are determined according to the Ford Lab Test Method (FLTM BN108-13). The apparatus consists of a moveable platform connected to five beams (250 mm long). A scratch pin is attached to one end of each beam. On the tip on each pin is a highly polished hardened steel ball (1.0+/−0.1 mm diameter). Each pin is loaded with a weight that exerts a force on the surface of a test plaque. Four force levels of the following may be selected: 15 Newton (N), 12 N, 10 N, and 7N and 3N. Driven by compressed air, the beams draw the pins across the surface of the plaque, which generates scratches or scratch whitening. A sliding velocity of approximately 100 mm/s is maintained. All tests are performed at room temperature on test plaques conditioned at 25° C. for more than 24 h prior to testing. The highest force value that doesn't produce scratch whitening is reported.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A polymeric composition comprising:

i. a thermoplastic polyolefin, wherein the thermoplastic polyolefin includes a relatively high crystallinity portion having a crystallinity greater than 65% as measured according to ASTM D3417, wherein the concentration of the relatively high crystallinity portion is at least 70% by weight based on the total weight of the thermoplastic polyolefin; the relatively high crystallinity portion has a melt flow rate from about 4 to about 29 g/10 min measured at 230° C./2.16 kg, the relatively high crystallinity portion includes one or more polypropylenes present at a concentration of at least 95 weight percent based on the total weight of the relatively high crystallinity portion, and the one or more polypropylenes of the relatively high crystallinity portion are one or more polypropylene homopolymers;

ii. from about 10% to about 50% by weight polyolefin elastomer based on the total weight of the polymeric composition; wherein the polyolefin elastomer has a melt flow rate measured at 190° C./2.16 kg from about 0.5 to about 25 g/10 minutes and is formed of one or more SLEPs, LEPs, or both and consists of copolymers of ethylene and one or more α-olefin comonomers; and iii at least 9 percent by weight filler based on the total weight of the polymeric composition, wherein the polymeric composition is without any calcined filler or contains less than 0.1 percent by weight calcined filler based on the total weight of the polymeric composition; and wherein the polymeric composition includes a lower crystallinity grade, the lower crystallinity grade includes isotactic polypropylene, and the lower crystallinity grade is present at a concentration of less than 10 wt. %, based on the total weight of the composition;

wherein the polymeric composition has a flexural modulus from about 1700 to about 2500 MPa, and the polymeric composition exhibits a scratch resistance of at least about 10 newtons as measured by FLTM BN108-13.

2. The composition of claim 1, wherein the filler includes at least 85 percent by weight talc, based on the total weight of the filler.

3. The composition of claim 1, wherein the concentration of the polyolefin elastomer is less than about 25 percent by weight, based on the total weight of the polymeric composition.

4. The composition of claim 1, wherein the concentration of the thermoplastic polyolefin is from about 60 percent by weight to about 90 percent by weight based on the total weight of the polymeric composition.

5. The composition of claim 4, wherein the concentration of the polyolefin elastomer is less than about 25 percent by weight based on the total weight of the polymeric composition; the concentration of the thermoplastic polyolefin is from about 60 percent by weight to about 90 percent by weight based on the total weight of the polymeric composition; the filler includes at least 85 percent by weight talc based on the total weight of the filler; and the concentration of the filler is less than about 35 percent by weight based on the total weight of the polymeric composition.

6. The composition of claim 5, wherein the concentration of the relatively high crystallinity portion is at least 85 percent by weight based on the total weight of the thermoplastic polyolefin.

7. The composition of claim 1, wherein the polymeric composition is without any grafted polymers.

8. The composition of claim 7, wherein the polymer composition exhibits a scratch resistance of at least 12 newtons, as measured by FLTM BN108-13.

9. An article comprising the composition of claim 8, wherein the article includes an instrument panel of an automotive vehicle and is visible from the interior of the vehicle.

10. The composition of claim 1, wherein the relatively high crystalline portion has a MFR greater than about 4 g/10 min and less than about 20 g/10 min.

11. The composition of claim 6, wherein the relatively high crystalline portion has a MFR greater than about 4 g/10 min and less than about 20 g/10 min.

12. The composition of claim 1, wherein the thermoplastic polyolefin includes one or more lower crystallinity grades of polypropylene having a crystallinity less than the relatively high crystallinity portion, wherein the concentration of the one or more lower crystallinity grades is at least about 2 percent by weight and less than about 10 percent by weight based on the total weight of the polymeric composition.

13. The composition of claim 12 wherein the relatively high crystallinity portion includes a first polypropylene and a second polypropylene, and the one or more lower crystallinity grades includes a third polymer, wherein the third polypropylene is a lower crystallinity polypropylene.

14. The composition of claim 12 wherein the weight percent (W) of the polyolefin elastomer within the polymeric composition varies with the MFR (M) in units of g/10 min and measured at 230° C./2.16 kg of the highly crystalline portion of thermoplastic polyolefin according the following equation:

$$W=0.43(M)+15.8$$

wherein the polyolefin elastomer is in a range that is determined by (W) according to the above equation and about ±30% thereof.

15. The composition of claim 14, wherein the concentration of the filler is less than about 25% by weight based on the total weight of the polymeric composition.

16. A polymeric composition comprising:
i) a thermoplastic polyolefin including at least 40 wt. % polypropylene based on the total weight of the polymeric composition, wherein the thermoplastic polyolefin consists of one or more polypropylenes, the thermoplastic polyolefin includes a relatively high crystallinity portion having a crystallinity greater than 65% as measured according to ASTM D3417, and one or more lower crystallinity grades having a crystallinity less than the relatively high crystallinity portion, wherein the concentration of the relatively high crystallinity portion is at least 70 wt. % based on the total weight of the thermoplastic polyolefin, the relatively high crystallinity portion has a melt flow rate from about 4 to about 29 g/10 min measured at 230° C./2.16 kg, and the relatively high crystallinity portion includes one or more polypropylenes present at a concentration of at least 95 wt. % based on the total weight of the relatively high crystallinity portion, and the one or more polypropylenes of the relatively high crystalline portion are one or more polypropylene homopolymers wherein the lower crystallinity grade includes isotactic polypropylene;
ii) from 10% to 50% by weight of a polyolefin elastomer based on the total weight of the polymeric composition; wherein the polyolefin elastomer has a melt flow rate measured at 190° C./2.16 kg from about 0.5 to about 25 g/10 minutes and is formed of one or more linear or substantial linear ethylene copolymers, wherein the linear or substantially linear ethylene copolymer are copolymers of ethylene and one or more α-olefin comonomers;
iii) at least 9% filler based on the total weight of the polymeric composition, wherein the polymeric composition is without any calcined filler or contains less than 0.1 percent by weight calcined filler based on the total weight of the polymeric composition;
iv) optionally one or more additives selected from the group consisting of surfactants, flexibilizers, strength agents, ignition resistant additives, stabilizers, colorants, antioxidants, antistats, and nucleating agents; and
v) optionally one or more molding agents, wherein the molding agent is a nitrogen or ammonia containing compound;
wherein the polymer composition is substantially without any graft polymers, and the polymer composition is free of EPDM rubber; and
wherein the polymeric composition has a flexural modulus from about 1700 to about 2500 MPa, and the polymeric composition exhibits a scratch resistance of at least 10 newtons, as measured by FLTM BN 108-13.

17. A polymeric composition comprising:
i) a thermoplastic polyolefin that includes polypropylene, wherein
   the thermoplastic polyolefin includes a relatively high crystallinity portion that is at least 50% by weight of the thermoplastic polyolefin,
   the relatively high crystallinity portion consists of one or more polypropylene homopolymers,
   the concentration of the relatively high crystallinity portion is at least 70% by weight of the thermoplastic polyolefin,
   the relatively high crystallinity portion has a crystallinity greater than 60% as measured according to ASTM D3417,
   the highly crystalline portion has a melt flow rate from 4 to 29 g/10 min measured at 230° C./2.16 kg,
   the thermoplastic polyolefin includes a lower crystallinity grade of polypropylene, the lower crystallinity grade of polypropylene is a high impact polypropylene copolymer present at a concentration of at least 2 wt. % and less than 16 wt. % based on the total weight of the polymeric composition; and
   the high impact polypropylene copolymer has a weight fraction of ethylene of 0.12±50%, a melt flow rate of 1.2±50%, and a density of 0.89±50%,
ii) from 10% to 25% by weight of a polyolefin elastomer based on the total weight of the polymeric composition; wherein the polyolefin elastomer has a melt flow rate measured at 190° C./2.16 kg from about 0.5 to about 25 g/10 minutes and is formed of one or more linear or substantial linear ethylene copolymers, wherein the linear or substantially linear ethylene copolymer are copolymers of ethylene and one or more α-olefin comonomers;
iii) at least 9% filler based on the total weight of the polymeric composition, wherein the polymeric composition is without any calcined filler or contains less than 5% by weight calcined filler based on the total weight of the polymeric composition; and
iv) the polymeric composition optionally includes one or more additives selected from the group consisting of surfactants, flexibilizers, strength agents, ignition resistant additives, stabilizers, colorants, antioxidants, antistats, slip aids, flow enhancers, and nucleating agents;
wherein the polymer composition is substantially without any graft polymers, and the polymer composition is free of EPDM rubber; and
wherein the polymeric composition has a flexural modulus from about 1300 to about 3000 MPa, and
wherein the polymeric composition has a flexural modulus from about 1700 to about 2500 MPa, and the polymeric composition exhibits a scratch resistance of at least 7 newtons, as measured by FLTM BN108-13.

18. The composition of claim 17, wherein the one or more polypropylene homopolymers includes an isotactic polypropylene homopolymer having a melt flow rate of 8 g/10 min±50% as measured at 230° C./2.16 kg and a density of 0.9 g/cm$^3$±50%.

19. The composition of claim 1, wherein the filler is talc and is present at a concentration from about 17 wt. % to about 22 wt. %, based on the total weight of the polymeric concentration; and the composition has a scratch resistance of about 15 N or more.

* * * * *